United States Patent
Gohain et al.

(10) Patent No.: US 12,481,556 B2
(45) Date of Patent: Nov. 25, 2025

(54) ENHANCED READ PERFORMANCE FOR MEMORY DATA WORD DECODING USING POWER ALLOCATION BASED ON ERROR PATTERN DETECTION

(71) Applicant: Micron Technology, Inc., Boise, ID (US)

(72) Inventors: Nitul Gohain, Karnataka (IN); Jameer Mulani, Mulani (IN); Jonathan S. Parry, Boise, ID (US)

(73) Assignee: Micron Technology, Inc., Boise, ID (US)

(*) Notice: Subject to any disclaimer, the term of this patent is extended or adjusted under 35 U.S.C. 154(b) by 77 days.

(21) Appl. No.: 18/519,458

(22) Filed: Nov. 27, 2023

(65) Prior Publication Data
US 2024/0176701 A1    May 30, 2024

Related U.S. Application Data

(60) Provisional application No. 63/428,298, filed on Nov. 28, 2022.

(51) Int. Cl.
*G06F 11/10* (2006.01)
*G06F 11/07* (2006.01)

(52) U.S. Cl.
CPC ...... *G06F 11/1068* (2013.01); *G06F 11/0757* (2013.01); *G06F 11/0772* (2013.01)

(58) Field of Classification Search
CPC ............. G06F 11/1068; G06F 11/0757; G06F 11/0772; G06F 2201/81; G06F 11/0727; G06F 11/073; G06F 11/076; G06F 11/0793

USPC .......................................................... 714/764
See application file for complete search history.

(56) References Cited

U.S. PATENT DOCUMENTS

| | | | | |
|---|---|---|---|---|
| 2003/0103428 A1* | 6/2003 | Lu | ....... | G11B 7/24082 |
| 2012/0151296 A1* | 6/2012 | Nishikawa | ....... | H04L 9/065 |
| | | | | 714/755 |
| 2015/0033093 A1* | 1/2015 | Yeung | ....... | G06F 11/10 |
| | | | | 714/752 |
| 2017/0031755 A1* | 2/2017 | Nakanishi | ....... | G11C 29/52 |
| 2018/0157551 A1* | 6/2018 | Ryabinin | ....... | G06F 1/3206 |
| 2019/0050287 A1* | 2/2019 | Yang | ....... | G11C 29/52 |
| 2021/0297092 A1* | 9/2021 | Kang | ....... | H03M 13/6325 |
| 2023/0083269 A1* | 3/2023 | Kumano | ....... | H03M 13/1111 |
| | | | | 714/752 |

* cited by examiner

*Primary Examiner* — James C Kerveros
(74) *Attorney, Agent, or Firm* — Holland & Hart LLP

(57) ABSTRACT

Methods, systems, and devices to enhance read performance for memory data word decoding using power allocation based on error pattern detection in both QLC and TLC in both QLC and TLC products are described. A plurality of data words may be processed using a first decoder engine of a decoder of a memory device according to a first power setting. The decoder may detect a pattern of errors in the plurality of data words. The decoder may further communicate a status signal based on detecting the pattern of errors. The resource manager may allocate based on the status signal, a second amount of power credits to the decoder. The decoder may process a portion of the plurality of data words using a second decoder engine according to the second amount of power credits.

20 Claims, 6 Drawing Sheets

ENHANCED READ PERFORMANCE FOR MEMORY DATA WORD DECODING USING POWER ALLOCATION BASED ON ERROR PATTERN DETECTION

CROSS REFERENCE

The present application for patent claims the benefit of U.S. Provisional Patent Application No. 63/428,298 by GOHAIN et al., entitled "ENHANCED READ PERFORMANCE FOR MEMORY DATA WORD DECODING USING POWER ALLOCATION BASED ON ERROR PATTERN DETECTION," filed Nov. 28, 2022, assigned to the assignee hereof, and expressly incorporated by reference in its entirety herein.

FIELD OF TECHNOLOGY

The following relates to one or more systems for memory, including enhanced read performance for memory data word decoding using power allocation based on error pattern detection.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
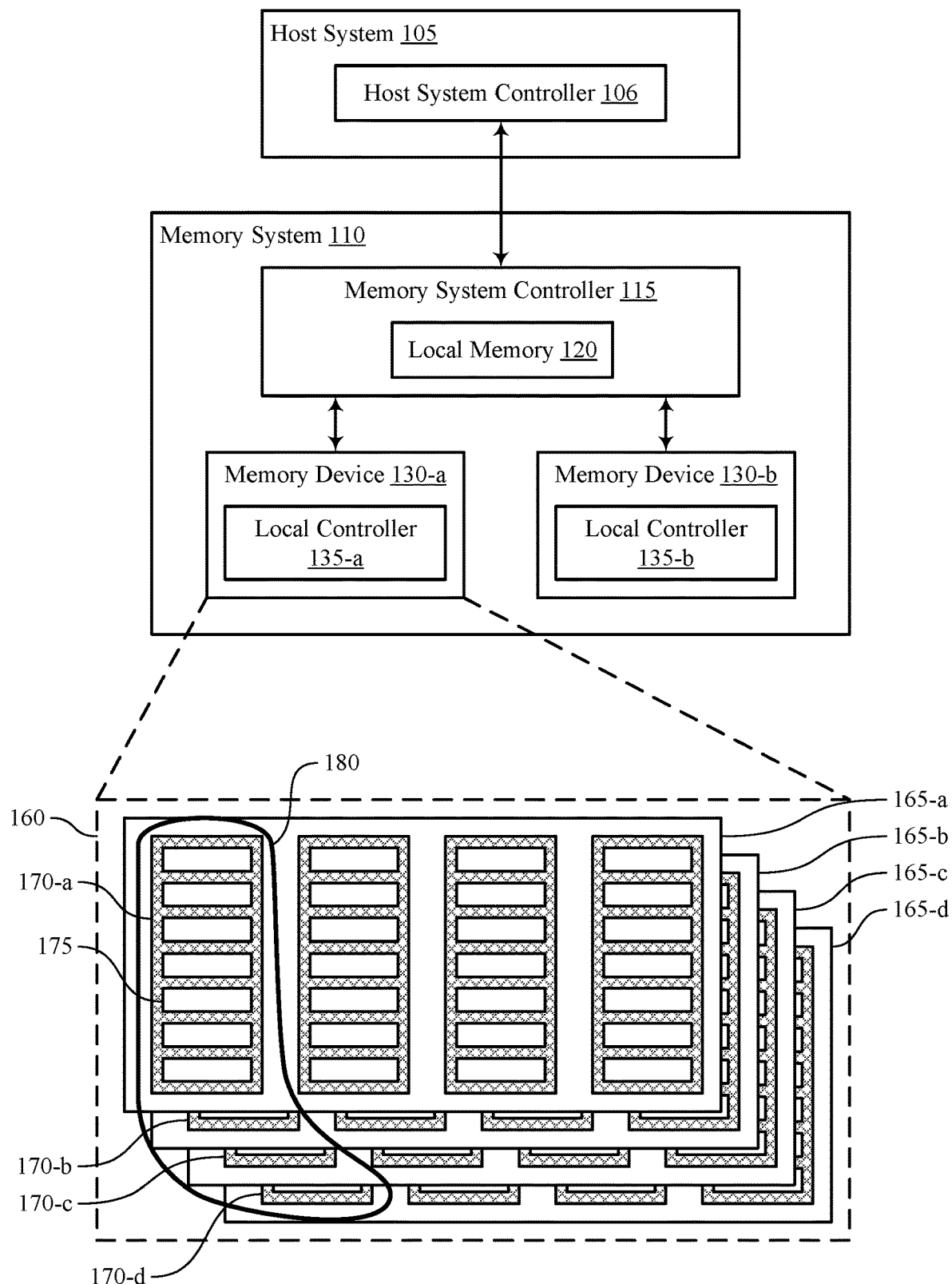
FIG. 1 illustrates an example of a system that supports enhanced read performance for memory data word decoding using power allocation based on error pattern detection in both QLC and TLC in accordance with examples as disclosed herein.

A memory system may receive and process commands from a host system, and may assign the commands to queues for processing (or decoding) by one or more decoder engines. The raw bit error rate (RBER), which refers to the probability of raw bit errors in read operations, has increased significantly in the current generation of higher-order not-AND (NAND) memory products. For example, higher order NAND memory products may include triple-level cell (TLC), quad-level cell (QLC) or penta-level cell (PLC) NAND memory. This increases the probability of triggering read retry and using higher iterations and levels of parity to correct the bit errors. RBER varies according to conditions exposed like cross-temperature (X-Temp), data retention (DR), qualification conditions (e.g., bake cycles), etc. RBER also varies between word lines, with some word lines having inherently higher RBER than others.

Current memory systems operate at or close to power limits of the systems in which they are incorporated, and thus may monitor and control power distribution to memory components or operations. In some cases, memory systems may implement a power credit system to allocate shared power for different operations. It is desired to operate a decoder (e.g., a low-density parity-check (LDPC) decoder) at higher frequencies for higher RBER conditions, but at lower frequencies for normal RBER conditions. Static allocation of power credits can adversely affect performance of the memory system. For example, if a static allocation of power credits is selected for worst RBER conditions, then much of the allocated power credits will be unutilized during normal RBER conditions. If a static allocation of power credits is selected for normal RBER conditions, however, processing throughput may be affected because the decoder may not be able to operate at higher frequencies.

Methods, systems, and devices for enhancing read performance for memory data word decoding using power allocation based on error pattern detection in both QLC and TLC are described. In some systems, a decoder may utilize two types of decoders (e.g., decoder engines), namely a first decoder engine and a second decoder engine. The first decoder engine may be used to process data words using a first amount of power credits. The decoder may identify conditions that exceed certain error levels at the first decoder engine and request additional power credits. The decoder may use the second decoder engine to process certain data words at a higher frequency using the additional power credits. The improvements include an ability to predict read errors and prioritize read error correction over other operations of the memory system by reserving additional power credits for allocation to the second decoder engine when errors are detected. Other improvements include an ability to maintain desired minimum read QoS. Such techniques further improve power management for read operations while reducing the RBER.

In addition to applicability in memory systems described herein, techniques for enhanced read performance for memory data word decoding may be generally implemented to improve sustainability and/or data integrity features of various electronic devices and systems. As the use of electronic devices for handling private, user, or other information has become even more widespread, electronic devices and systems need to ensure appropriate and budgeted data storage and integrity. Implementing the techniques described herein may improve the budget of resources used and integrity of electronic devices and systems, along with data, by determining an aggregate difference between sets of states, and programming a first set of memory cells with first data if the aggregate difference is less than a threshold or generating a new scrambling seed to rescramble the first data and determine a new aggregate difference by enhancing read performance for memory data word decoding using power allocation based on error pattern detection, for example in QLC and/or TLC, among other examples.

Figure 2:
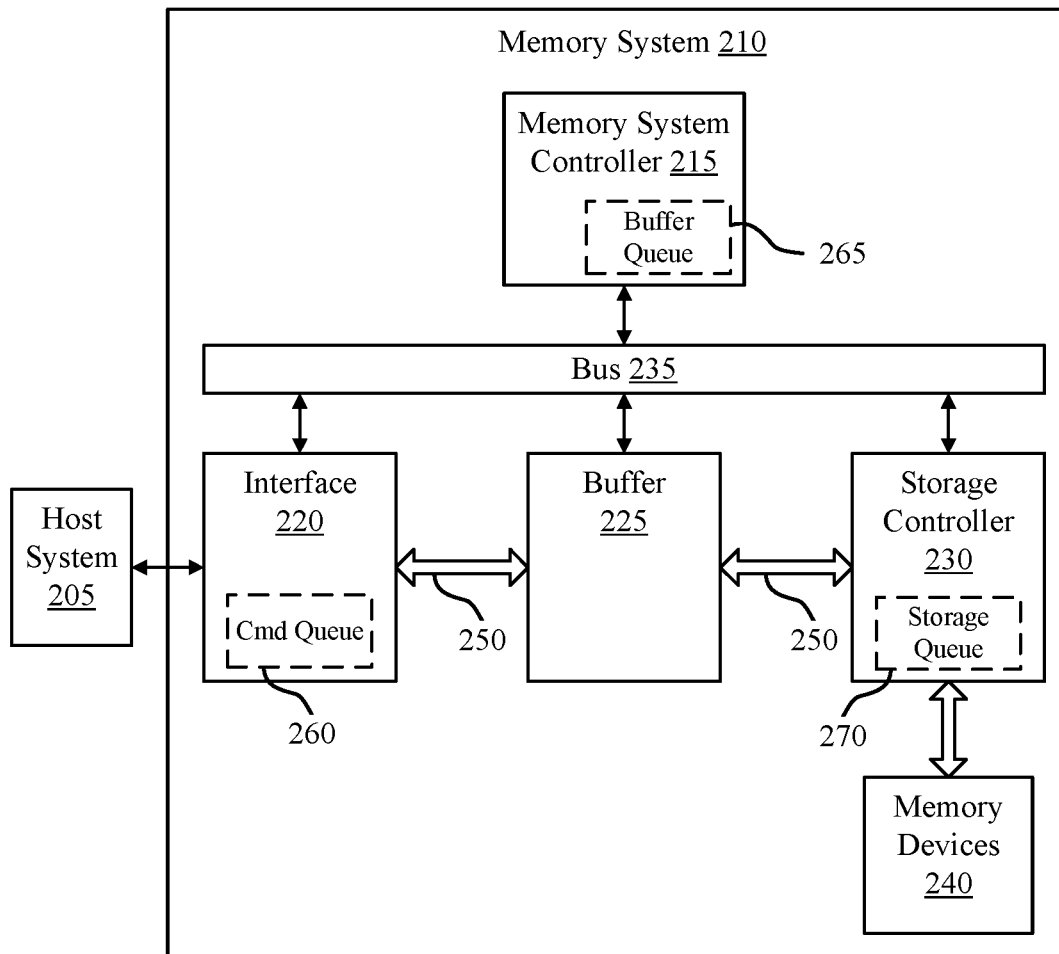
FIG. 2 illustrates an example of a system that supports enhanced read performance for memory data word decoding using power allocation based on error pattern detection in both QLC and TLC in accordance with examples as disclosed herein.

Features of the disclosure are initially described in the context of systems, devices, and circuits with reference to FIGS. 1 through 2. Features of the disclosure are described in the context of a memory system that supports a method to optimize read performance by guaranteeing minimum power for a decoding engine during high RBER in both QLC and TLC products with reference to FIGS. 3 through 4. These and other features of the disclosure are further illustrated by and described in the context of an apparatus diagram and flowchart that relate to enhanced read performance for memory data word decoding using power allocation based on error pattern detection with reference to FIGS. 5 through 6.

FIG. 1 illustrates an example of a system 100 that supports enhanced read performance for memory data word decoding using power allocation based on error pattern detection in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations-which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support a method to enhanced read performance for memory data word decoding using power allocation based on error pattern detection in both QLC and TLC products. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some examples, the memory system 110 may process a plurality of data words using a first decoder engine of a low density parity check (LDPC) decoder of a memory device 130 according to a first power setting that is based at least in part on a first amount of power credits allocated to the decoder. The decoder may detect a pattern of errors in the plurality of data words based at least in part on processing the plurality of data words using the first decoder engine. The decoder may further communicate a status signal upon detecting the pattern of errors in the plurality of data words. The resource manager may allocate a second amount of power credits to the decoder based on the status signal. The decoder may additionally process a portion of the plurality of data words using a second decoder engine of the decoder according to a second power setting that is based at least in part on the second amount of power credits allocated to the decoder. Accordingly, error correction can be prioritized during read operations while maintaining a desired quality of service (QoS).

FIG. 2 illustrates an example of a system 200 that supports enhanced read performance for memory data word decoding using power allocation based on error pattern detection in both QLC and TLC products in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

Once the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

Figure 3:
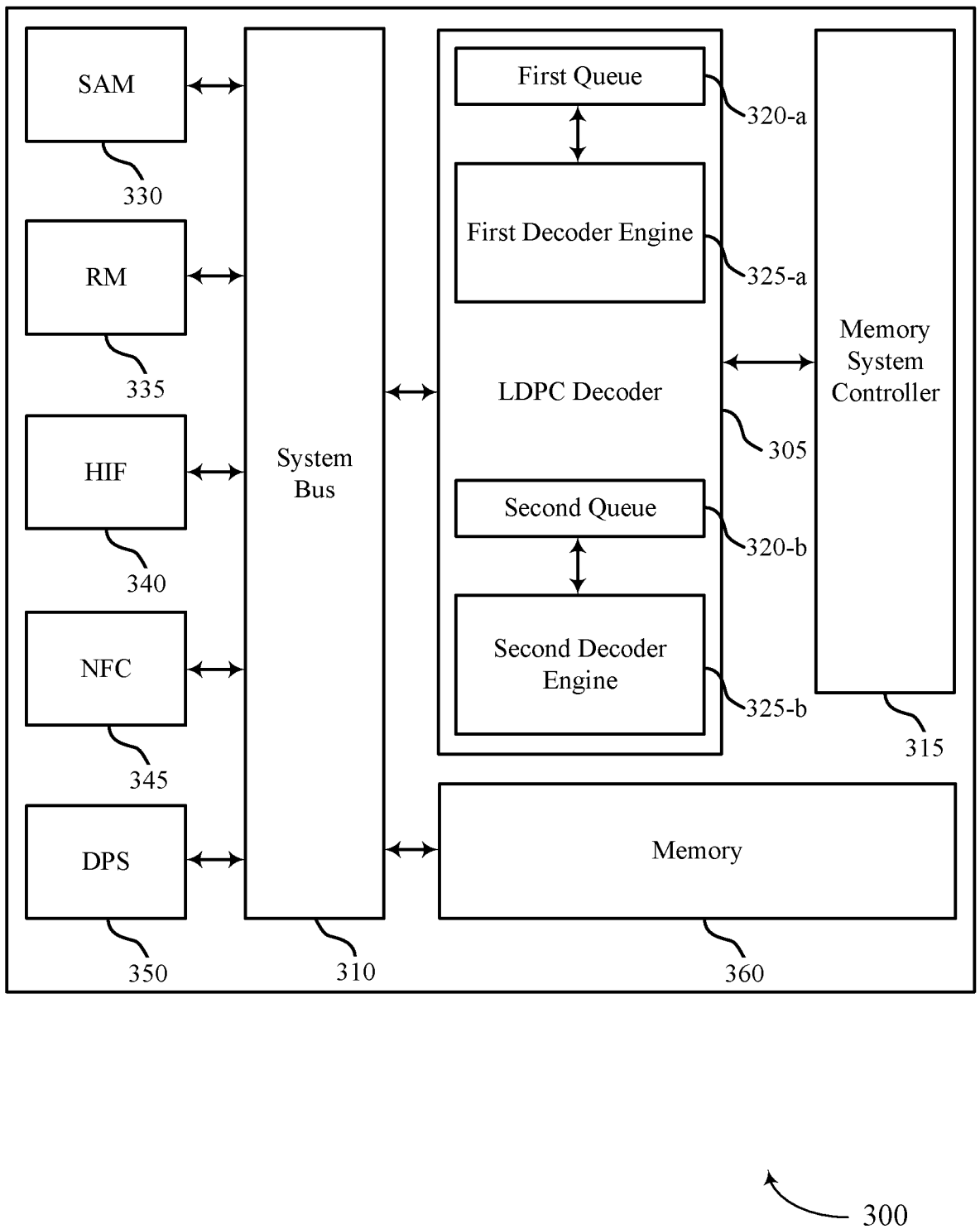
FIG. 3 illustrates an example of a memory system that supports enhanced read performance for memory data word decoding using power allocation based on error pattern detection in both QLC and TLC in accordance with examples as disclosed herein.

FIG. 3 illustrates an example of a memory system 300 that supports enhanced read performance for memory data word decoding using power allocation based on error pattern detection in accordance with examples as disclosed herein. The memory system 300 may be an example of a system 100 or a system 200 as described with reference to FIG. 1 and FIG. 2, respectively. The memory system 300 may also implement aspects of the system 100 or the system 200 as described with reference to FIG. 1 and FIG. 2, respectively. For example, the memory system 300 may be an example of the memory system 110 or the memory system 210. Additionally, the memory system controller 315 may be an example of the memory system controller 115 or the memory system controller 215. Aspects of the memory system 300 may be omitted from FIG. 3 for illustrative clarity. In some cases, the memory system 300 may assign commands from a host system (not shown) to queues 320 of the memory system 300 based on the processing capability of decoder engines 325 associated with the queues 320 or characteristics of the data associated with the command.

The memory system 300 may include a memory system controller 315 configured to process commands (e.g., read or write commands) received from a host system. The memory system controller 315 may be configured to assign the commands to components of the memory system 300. The memory system controller 315 may be a central processing unit (CPU) that includes firmware configured to assign received codewords (or data words) for decoding by a low-density parity-check (LDPC) decoder 305 (e.g., coupled with the memory system controller 315) as described herein.

The memory system 300 may include the LDPC decoder 305 configured to receive the codewords (or data words) from the memory system controller 315. The LDPC decoder 305 may include a first queue 320-$a$ and a second queue 320-$b$ for storing (e.g., temporarily storing) the data words to be decoded, based on various criteria. The LDPC decoder 305 may include a first decoder engine 325-$a$ associated with the first queue 320-$a$. The first decoder engine 325-$a$ may process (e.g., decode) the data words assigned to the first queue 320-$a$. The LDPC decoder 305 may further include a second decoder engine 325-$b$, which may process the data words assigned to the second queue 320-$b$.

As described herein, the first decoder engine 325-$a$ may be associated with a first power setting. The first decoder engine 325-$a$ may also be associated with a first type of processing. According to an example, the first power setting may correspond to a lower power level and the first type of processing may correspond to processing having a high level of efficiency for processing higher quantities of data words.

In some examples, a high level of efficiency may be achieved at the expense of lower reliability in the presence of larger number of bit errors. In some examples, the LDPC decoder 305 may temporarily store all received data words in the first queue 320-$a$. In other examples, the LDPC decoder 305 may selectively store data words in the first queue 320-$a$ based on predetermined criteria such as current number of data words in the first queue 320-$a$, location from which the data words are read, operational parameters and/or statistics of the memory system, 300, etc. The first decoder engine 325-$a$ may continually check the contents of the first queue 320-$a$ and process any data words contained therein.

The second decoder engine 325-$b$ may be associated with a second power setting. The second decoder engine 325-$b$ may also be associated with a second type of processing. According to an example, the second power setting may correspond to a higher power level and the second type of processing may correspond to processing having a higher level of reliability (e.g., higher reliability than the first decoder engine 325-$a$). The second power setting may also correspond to a higher clock frequency than the first power setting. In some examples, the LDPC decoder 305 may temporarily store data words that cannot be processed by the first decoder engine 325-$a$ in the second queue 320-$b$. In other examples, the LDPC decoder 305 may selectively store data words in the second queue 320-$b$ based on predetermined criteria such as current number of data words in the first queue 320-$a$ and/or second queue 320-$b$, location from which the data words are read, operational parameters and/or statistics of the memory system, 300, etc. The second decoder engine 325-$b$ may continually check the contents of the second queue 320-$b$ and process any data words contained therein.

The first decoder engine 325-$a$ may be configured to process a relatively high quantity of data words with respect to the second decoder engine 325-$b$. That is, the first decoder engine 325-$a$ may be utilized to process (e.g., decode) data words at a relatively high speed with low latency. In another example, the second decoder engine 325-$b$ may process a relatively lower quantity of data words than the first decoder engine 325-$a$. However, the second decoder engine 325-$b$ may process (e.g., decode) data words with a relatively high level of reliability. That is, the second decoder engine 325-$b$ may be utilized to decode data words where reliability is a relatively higher priority and the latency for decoding the data words is a relatively lower priority. In some examples, the second decoder engine 325-$b$ processes data words that cannot be processed by the first decoder engine 325-$a$. For example, if the first decoder engine 325-$a$ encounters an error (e.g., decoding fails, decoding does not complete within a time duration) while processing a data word or sequence of data words, then such data word or data words may be placed in the second queue 320-$b$ for processing by the second decoder engine 325-$b$. In some cases, the memory system controller 315 may receive the read commands from the host system and assign the data words to the first queue 320-$a$ or the second queue 320-$b$ based on the RBER at the first decoder engine 325-$a$, location of the data words, an expected latency, etc. In some examples, the commands may be associated with data words containing different types of data, such that the expected latency for processing the commands may be based on the types of data.

The LDPC decoder 305 may be coupled with a system bus 310. The system bus 310 may be a pathway (e.g., a channel) connecting various components of the memory system 300. For example, the system bus 310 may be coupled with a system area manager (SAM) 330, a resource manager (RM)

335, a host interface (HIF) 340, a NAND flash controller (NFC) 345 (e.g., a memory system controller 115 or a memory system controller 215 as described with reference to FIGS. 1 and 2, respectively), and a dynamic partitioning scheduler (DPS) 350. The system bus 310 may also be coupled with memory 360. The memory 360 may have a plurality of memory arrays, request queues, status queues, command memory arrays, address lists, and user-data length lists for storing data. In some cases, the memory 360 may be associated with die-to-die and block-to-block variation, such that the RBER and the retention capability of blocks in the memory 360 may vary. In some cases, the memory 360 may include one or more blocks that degrade relatively quickly if exposed to external conditions such as high temperature, but may otherwise function normally. For example, a block may have a source of physical degradation that may lead to greater errors in reading data words. In such cases, the LDPC decoder 305 may assign the data to the second queue 320-$b$ based on a desire for increased reliability capabilities.

In some cases, the memory system controller 315 may assign the command to the first queue 320-$a$ and the first decoder engine 325-$a$ may process the command (e.g., by decoding the command). In some other cases, the memory system controller 315 may assign the command to the first queue 320-$a$, and the command may not be processed by the first decoder engine 325-$a$ for a duration that exceeds a threshold (e.g., a timeout may occur). Such a timeout may cause the latency for performing commands to increase and may reduce the performance of the memory system (e.g., the memory system may take longer to perform host-initiated commands and may reduce a host system's ability to submit additional commands to the memory system). In such cases, the LDPC decoder 305 may assign (e.g., reassign) the command to the second queue 320-$b$ to be processed by the second decoder engine 325-$b$. In examples where the first decoder engine 325-$a$ experiences a timeout, the LDPC decoder 305 may set a threshold quantity of iterations that the first decoder engine 325-$a$ may attempt to process the command. In some implementations, the LDPC decoder 305 may compare the quantity of iterations performed to the threshold quantity of iterations, such that the first decoder engine 325-$a$ may be prevented from processing the command if the threshold quantity of iterations is reached.

According to the examples disclosed herein, the RM 335 may allocate power to the LDPC decoder 305 in the form of power credits. In one example, the LDPC decoder 305 may allocate a predetermined amount (e.g., a first amount) of power credits to process commands for decoding data words read from memory 360. The LDPC decoder 305 may allocate the predetermined amount of power credits to the first decoder engine 325-$a$ based on storing data words in the first queue 320-$a$. The LDPC decoder 305 may also allocate a second amount of power credits to the second decoder engine 325-$b$ based on moving data words from the first queue 320-$a$ to the second queue 320-$b$, or directly storing data words to the second queue 320-$b$. According to other examples, the RM 335 may allocate the predetermined amount of power credits to the first decoder engine 325-$a$ and the second decoder engine 325-$b$. For example, the LDPC decoder 305 may provide an indication that data words have been stored in the first queue 320-$a$ or second queue 320-$b$. The RM 335 may allocate the first amount of power credits or the second amount of power credits based on the indication.

According to the examples disclosed herein, the LDPC decoder 305 may receive a command to process (e.g., decode) a plurality of data words. The data words may be processed using the first decoder engine 325-$a$ based on a first power setting associated with a first amount of power credits. For example, the LDPC decoder 305 may store the data words in the first queue 320-$a$ for processing by the first decoder engine 325-$a$. In some examples, the first decoder engine 325-$a$ may be a lower latency, less capable (e.g., lower reliability) decoder engine of the LDPC decoder 305 which requires less power and less iterations to process data words. The first decoder engine 325-$a$ may therefore be capable of processing data words at a higher rate than the second decoder engine 325-$b$ due to the lower number of iterations required to process each data word. The first decoder engine 325-$a$ may therefore be suitable for use under normal RBER conditions.

In some examples, the second decoder engine 325-$b$ may be a higher latency, more capable (e.g., higher reliability) decoder engine of the LDPC decoder 305 which requires higher power and more iterations to process data words. The second decoder engine 325-$b$ may therefore be capable of processing data words with a higher likelihood of successful decoding than the first decoder engine 325-$a$ due to the increased number of iterations applied to process each data word. Under certain conditions, however, the second decoder engine 325-$b$ may process data words at a lower rate than the first decoder engine 325-$a$ due to the increased number of iterations required to process each data word. Thus, the second decoder engine 325-$b$ may be capable of processing data words with a higher level of reliability than the first decoder engine 325-$a$. The second decoder engine 325-$b$ may therefore be suitable for use under higher RBER conditions.

In one example, the first decoder engine 325-$a$ may be used for RBER≤9E-3, and the second decoder engine 325-$b$ may be used for RBER≥9E-3. The first decoder engine 325-$a$ processes data words until reaching an error or timeout condition. The data word (or data words) causing the timeout or error condition may be transferred to the second queue 320-$b$ for processing by the second decoder engine 325-$b$. According to an example, the RM 335 may allocate the first amount of power credits to the LDPC decoder 305. The LDPC decoder 305 may assign the first amount of power credits to the first decoder engine 325-$a$ based on the allocation. The LDPC decoder 305 may also operate the first decoder engine 325-$a$ using the first amount of power credits allocated from the RM 335. In another example, the RM 335 may allocate the first amount of power credits directly to the first decoder engine 325-$a$.

According to an example, the LDPC decoder 305 may detect a pattern of errors in the data words being processed by the first decoder engine 325-$a$. For example, the LDPC decoder 305 may determine if a quantity of consecutive data words having a threshold bit error rate has exceeded a predetermined value. In some examples, the LDPC decoder 305 may detect an iteration timeout at the first decoder engine 325-$a$ while processing the plurality of data words. In another example, the LDPC decoder 305 may monitor the depth of the second queue 320-$b$ to determine whether it exceeds a preset number of data words. The LDPC decoder 305 may also communicate the number of data words currently stored in the second queue 320-$b$ to the RM 335. The LDPC decoder 305 may subsequently communicate a status signal to the RM 335 upon detecting the pattern of errors in the data words. The status signal may be in the form of an interrupt generated by the LDPC decoder 305. The status signal may also include, or be in the form of, a budget scale value which requests a scaled value of the maximum peak power available to the second decoder engine 325-$b$.

According to one example, the LDPC decoder 305 may monitor the depth of the second queue 320-b to determine a level of operation for the second decoder engine 325-b. The LDPC decoder 305 may communicate a status signal which specifies a budget scale value corresponding to a desired level of operation for the second decoder engine 325-b. The budget scale value may, in some examples, correspond to the number of power credits being requested by the LDPC decoder 305 or allocated by the RM 335. According to another example, the LDPC decoder 305 may predict a need for operating the second decoder engine 325-b based on the condition of the memory device, location of data words, etc. The LDPC decoder 305 may communicate the status signal with an appropriate budget scale value for the second decoder engine 325-b. As illustrated in Table 1, the budget scale values may correspond to specific values ranging from 6.25% of peak power to 100% of peak power.

TABLE 1

| RM Budget Scale | Activity | RM Budget Scale | Activity |
|---|---|---|---|
| 0 | No Activity | 1 | 6.25% of peak power |
| 2 | 12.5% of peak power | 3 | 18.75% of peak power |
| 4 | 25% of peak power | 5 | 31.25% of peak power |
| 6 | 37.5% of peak power | 7 | 43.75% of peak power |
| 8 | 50% of peak power | 9 | 56.25% of peak power |
| 10 | 62.5% of peak power | 11 | 68.75% of peak power |
| 12 | 75% of peak power | 13 | 81.25% of peak power |
| 14 | 87.5% of peak power | 15 | 93.75% of peak power |
| 16 or higher | 100% of peak power | | |

In an example, the status signal provides an indication to the RM 335 that the first decoder engine 325-a is decoding data words with an RBER that is outside a predetermined rate (e.g., RBER≥9E-3). In other examples, the status signal may provide an indication that the amount of data words in the second queue 320-b has exceeded a threshold amount. The LDPC decoder 305 may also provide an indication of the number of data words in the second queue 320-b using one or more status registers.

According to the illustrated examples, the RM 335 may allocate the second amount of power credits to the LDPC decoder 305 upon receiving the status signal. The RM 335 may also monitor the one or more status registers and allocate the second amount of power credits to the LDPC decoder 305, for example, if the number of data words in the second queue 320-b exceeds the threshold amount. According to at least one example, the RM 335 may communicate a value indicative of a scaling factor relative to a maximum operating power for the LDPC decoder 305. The value may be based, at least in part, on allocating the second amount of power credits to the LDPC decoder 305. In some examples, the value may correspond to the budget scale value. The LDPC decoder 305 may process data words in the second queue 320-b (i.e., a portion of the received plurality of data words) using the second decoder engine 325-b. In one example, the second decoder engine 325-b processes the data words in the second queue 320-b according to a second power setting that is based, at least in part, on the second amount of power credits allocated to the LDPC decoder 305. In another example, the second power setting may correspond to the activity level associated with a budget scale value, as shown in Table 1.

The LDPC decoder 305 may further communicate a second status signal, for example, to the RM 335. The second status signal may provide an indication that the second decoder engine 325-b has completed processing the data words from the second queue 320-b. According to an example, the RM 335 may change the allocation of power credits to the LDPC decoder 305 from the second amount of power credits to the first amount of power credits upon receiving the second status signal. The LDPC decoder 305 may process additional data words using the first decoder engine 325-a according to a third power setting. The third power setting may be based, at least in part, on the first amount of power credits allocated to the LDPC decoder 305 by the RM 335.

According to some examples, the LDPC decoder 305 may communicate an additional status signal to the RM 335 in order to provide an indication of its current state. The additional status signal may indicate, for example, an active or inactive state for the first decoder engine 325-a, the second decoder engine 325-b, and/or the LDPC decoder 305.

According to the examples disclosed herein, the second amount of power credits may not be available when the LDPC decoder 305 communicates the status signal to the RM 335. In one example, the RM 335 may assign the maximum number of power credits currently available to the LDPC decoder 305. The LDPC decoder 305 may operate the second decoder engine 325-b at a lower clock frequency, based on the available power credits, to process the data words in the second queue 320-b. In another example, the status signal may be received or accessed by the memory system controller 315. In response to receiving the status signal, the memory system controller 315 may suspend one or more operations of the memory system 300. For example, the memory system controller 315 may control operations such as: wear-leveling, garbage collection, error control such as error-detecting or error-correcting, encryption, caching, media management, background refresh, scrub, block scans, health monitoring, address translations between logical addresses (e.g., LBAs) and physical addresses (e.g., physical block addresses), etc. The memory system controller 315 may suspend one or more of such operations. According to an example, the memory system controller 315 may select operations to be suspended based on priority. The memory system controller 315 may further reassign power credits from the suspended operations to the LDPC decoder 305. In one example, the memory system controller 315 may assign the power credits directly to the LDPC decoder 305. In another example, the memory system controller 315 may allocate the power credits to the RM 335 for subsequent assignment to the LDPC decoder 305.

According to some examples, various conditions may be monitored in order to predict a need to operate the second decoder engine 325-b. The temperature of the memory system 300 and/or the memory 360 may be monitored to detect variations or increases. The temperature may be monitored by the memory system controller 315, the LDPC decoder 305, internal sensors (not shown), external sensors (not shown), etc. The temperature may be monitored to detect a preset threshold (e.g., 120° F.) being exceeded or a temperature variation exceeding a preset range (e.g., 30° F. range). In some examples, such temperature changes may be indicative of the memory system 300 approaching a predetermined end-of-life cycle during which an increased number of errors may be encountered by the first decoder engine 325-a. Upon detecting the temperature exceeding the preset threshold or temperature variations exceeding the preset range, a request may be sent to the RM 335 to free up, or reserve, a third amount of power credits for allocation to the second decoder engine 325-b. The third amount of power credits may be reserved in anticipation that the second decoder engine 325-b will be selected to decode data words and/or correct errors encountered by the first decoder engine 325-a.

According to other examples, read activities for the memory system 300 may be monitored by the LDPC decoder 305, the memory system controller 315, etc. The number of read requests being processed by the first decoder engine 325-a may be compared to a predetermined threshold. The predetermined threshold may correspond to an instantaneous time measurement, a preset time interval, a variable time interval, etc. Upon detecting that the number of read requests exceeds the predetermined threshold, a request may be sent to the RM 335 to free up, or reserve, the third amount of power credits for allocation to the second decoder engine 325-b. The third amount of power credits may be reserved in anticipation that the number of data words in the first queue 320-a will exceed a threshold amount. The second decoder engine 325-b may then be selected to decode data words and/or correct errors encountered by the first decoder engine 325-a.

Although the decoder 305 is illustrated and described as an LDPC decoder, other types of decoders may also be used, without departing from the aspects described above. For example, the LDPC decoder 305 may be a linear block code decoder that may use coding schemes that are different from LDPC such as hamming codes, Hadamard codes, repetition codes, parity codes, Golay codes, Reed-Solomon codes, Reed-Muller codes, turbo codes, polar codes, and the like.

Figure 4:
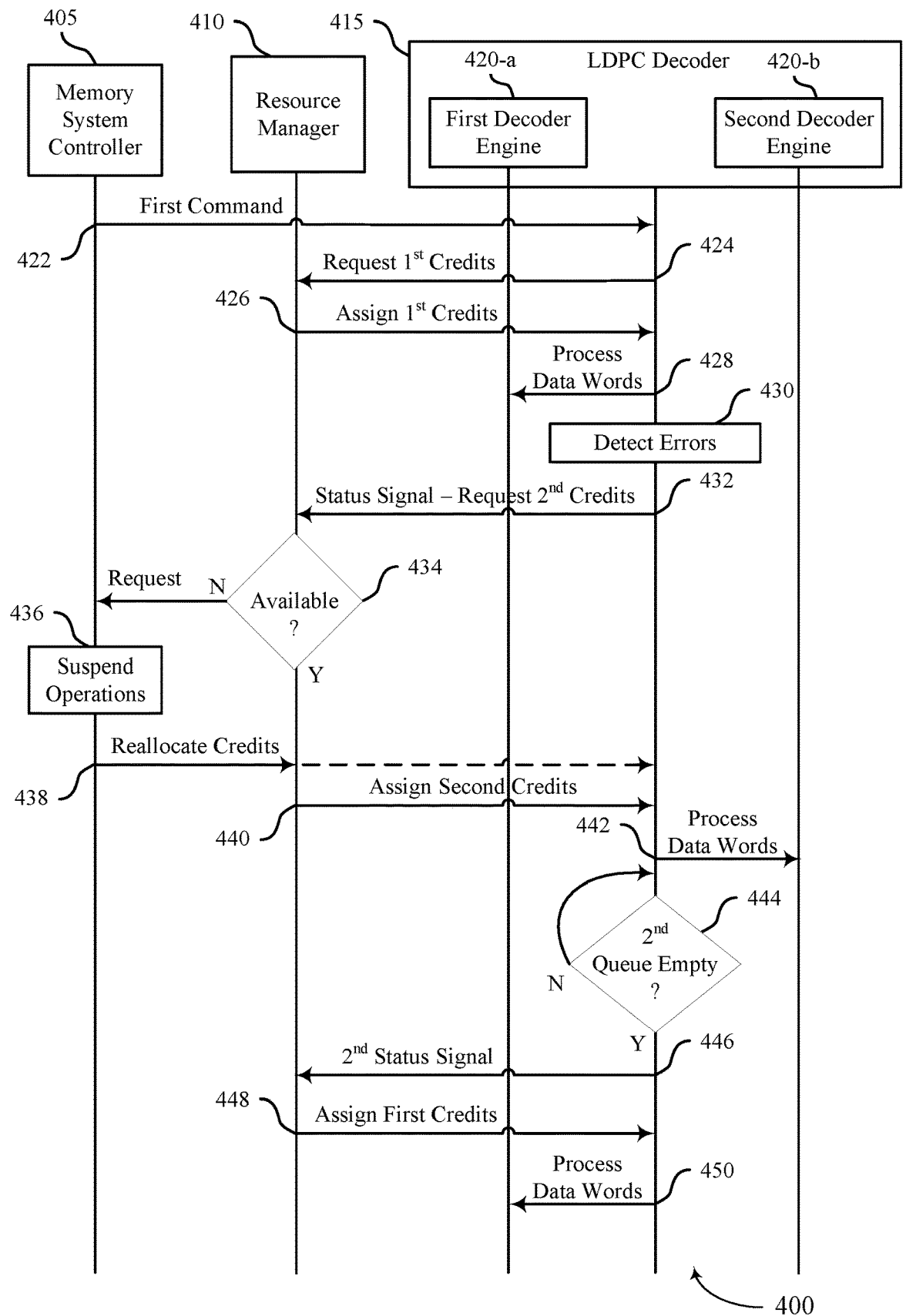
FIG. 4 illustrates an example of a process flow diagram that supports enhanced read performance for memory data word decoding using power allocation based on error pattern detection in both QLC and TLC in accordance with examples as disclosed herein.

FIG. 4 illustrates an example of a process flow diagram 400 that supports enhanced read performance for memory data word decoding using power allocation based on error pattern detection in both QLC and TLC products in accordance with examples as disclosed herein. The process flow diagram 400 may be an example for implementing aspects or operations of memory system 300 as described with reference to FIG. 3. Additionally, or alternatively, the process flow diagram may be an example for implementing aspects or operations of systems 100 and 200 as described with reference to FIGS. 1 and 2, respectively. In the following description of the process flow diagram 400, the operations may be performed in different orders or at different times, and some operations may be left out or added to the process flow diagram 400. In some examples, operations described as being included or performed at one component or system may additionally or alternatively be performed at another component or system. The process flow diagram 400 may include components not illustrated for clarity.

The process flow diagram 400 may include a memory system controller 405, which may be an example of the memory system controller 315 as described with reference to FIG. 3. The memory system controller 405 may include firmware for controlling the operations at the memory system. The memory system may also include a resource manager 410 and an LDPC decoder 415. The resource manager 410 may control various operations at the memory system, including allocation of power credits as described with reference to FIG. 3. The LDPC decoder 415 may include a first decoder engine 420-a and a second decoder engine 420-b, which may be examples of the first decoder engine 325-a and the second decoder engine 325-b as described with reference to FIG. 3. The memory system may include a first queue (not shown) associated with the first decoder engine 420-a and a second queue (not shown) associated with the second decoder engine 420-b At 422, the memory system controller 405 may transmit a first command to the memory to process a plurality of data words. The first command may be received at the LDPC decoder 415. In one example, the plurality of data words may be stored in the first queue. At 424, the LDPC decoder 415 may transmit a request for a first amount of power credits to the RM 410. At 426, the RM 410 assigns the first amount of power credits to the LDPC decoder 415. According to an example, the RM 410 may monitor the contents of the first queue and automatically assign the first amount of power credits to the LDPC decoder 415 as required.

At 428, the LDPC decoder 415 may operate the first decoder engine 420-a to process the data words stored in the first queue. At 430, the LDPC decoder 415 may monitor operation of the first decoder engine 420-a in order to detect a pattern of errors in the data words being processed. According to an example, the LDPC decoder 415 may determine if a quantity of consecutive data words having a threshold bit error rate exceeds a predetermined value. In one example, the LDPC decoder 415 may detect an iteration timeout at the first decoder engine 420-a while processing the plurality of data words. In another example, the LDPC decoder 415 may monitor the depth of the second queue to determine whether it exceeds a preset number of data words.

At 432, the LDPC decoder 415 transmits a status signal to the RM 410. The status signal may be transmitted upon detecting the pattern of errors at 430. In one example, the status signal may include, or be in the form of, a request for a second amount of power credits. In another example, the status signal may be in the form of an interrupt. Additionally, the status signal may include an indication of a budget scale value corresponding to a desired level of operation for the second decoder engine 420-b. Additionally or alternatively to detection of pattern of errors by the LDPC decoder 425, the LDPC decoder 415 may identify conditions that satisfy thresholds and may transmit the status signal to indicate the condition satisfying the threshold. For example, the LDPC decoder 425 may identify conditions such as temperature, physical addresses, or combinations thereof, and may transmit the status signal to the RM. The LDPC decoder 425 may also apply different thresholds to the detected patterns of errors based on conditions satisfying thresholds (e.g., a quantity of data words having threshold bit error rates satisfying a threshold, where the threshold is based on temperature).

At 434, the RM 410 may determine if the requested (or second) amount of power credits is available for allocation to the LDPC decoder 415. If the requested amount of power credits is not available, then the RM 410 may communicate a request the memory system controller 405 for additional power credits. At 436, the memory system controller 405 may suspend one or more operations. In some examples, the memory system controller 405 may select operations to be suspended based on a priority associated with operations controlled by the memory system controller 405.

At 438, the memory system controller 405 may reallocate power credits from the suspended operations to the RM 410. In some examples, the memory system controller 405 may assign the power credits directly to the LDPC decoder 415. At 440, the RM 410 assigns the second amount of power credits to the LDPC decoder 415.

At 442, the LDPC decoder 415 may operate the second decoder engine 420-b to process the data words stored in the second queue. At 444, the LDPC decoder 415 may determine if the second queue, associated with the second decoder engine 420-b, is empty. If the second queue is not empty (e.g., still contains one or more data words), then the LDPC decoder continues to monitor its status. If the second queue is empty, then the LDPC decoder 415 communicates a second status signal to the RM 410 at 446. The second status signal may provide an indication that the second decoder engine 420-*b* has finished processing data words, and has entered or will enter an idle mode. Accordingly, the higher amount of power associated with the second amount of power credits will no longer be required. At 448, the RM 410 assigns the first amount of power credits to the LDPC decoder 415. At 450, the LDPC decoder 415 may operate the first decoder engine 420-*a* to process the data words stored in the first queue.

Figure 5:
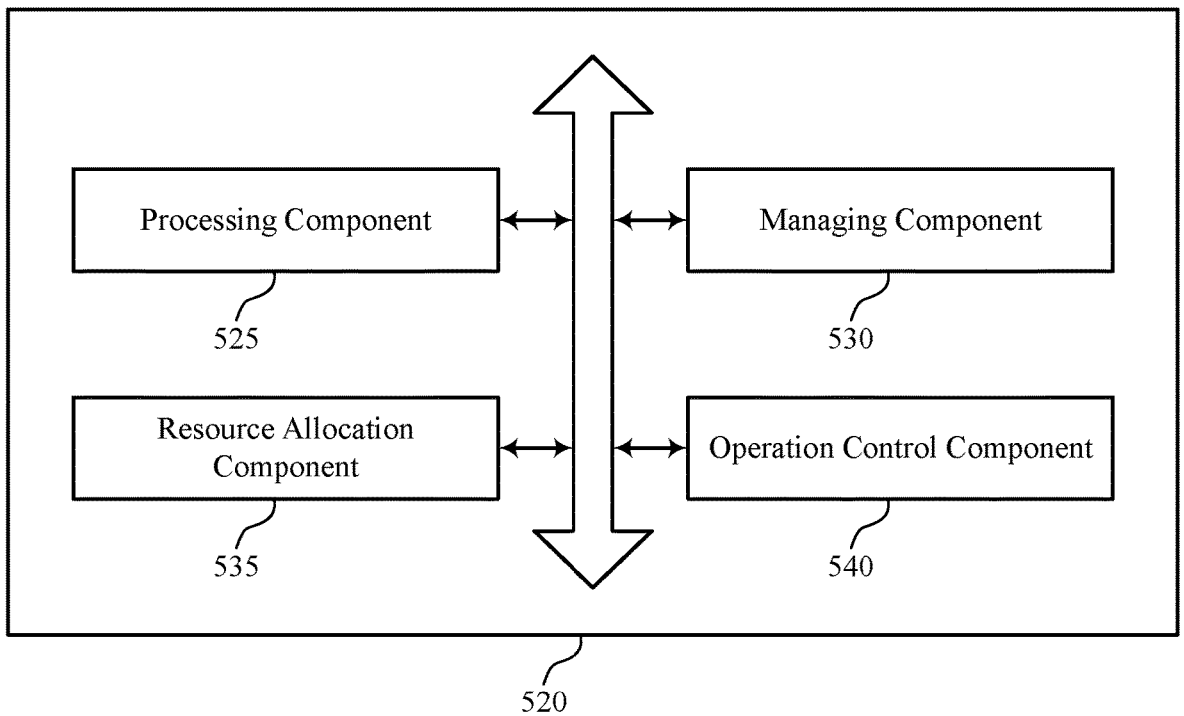
FIG. 5 shows a block diagram of a memory system that supports enhanced read performance for memory data word decoding using power allocation based on error pattern detection in both QLC and TLC in accordance with examples as disclosed herein.

FIG. 5 shows a block diagram 500 of a memory system 520 that supports enhanced read performance for memory data word decoding using power allocation based on error pattern detection in both QLC and TLC products in accordance with examples as disclosed herein. The memory system 520 may be an example of aspects of a memory system as described with reference to FIGS. 1 through 4. The memory system 520, or various components thereof, may be an example of means for performing various aspects of enhancing read performance for memory data word decoding using power allocation based on error pattern detection in both QLC and TLC products as described herein. For example, the memory system 520 may include a processing component 525, a managing component 530, a resource allocation component 535, an operation control component 540, or any combination thereof. Each of these components may communicate, directly or indirectly, with one another (e.g., via one or more buses).

The processing component 525 may be configured as or otherwise support a means for processing a plurality of data words using a first decoder engine of low density parity check (LDPC) decoder of a memory device according to a first power setting that is based at least in part on a first amount of power credits allocated to the LDPC decoder. The managing component 530 may be configured as or otherwise support a means for detecting, by the LDPC decoder, a pattern of errors in the plurality of data words based at least in part on processing the plurality of data words using the first decoder engine. In some examples, the managing component 530 may be configured as or otherwise support a means for communicating, by the LDPC decoder, a status signal based at least in part on detecting the pattern of errors in the plurality of data words. The resource allocation component 535 may be configured as or otherwise support a means for allocating, by a resource manager based at least in part on the status signal, a second amount of power credits to the LDPC decoder. In some examples, the processing component 525 may be configured as or otherwise support a means for processing, by the LDPC decoder, a portion of the plurality of data words using a second decoder engine of the LDPC decoder according to a second power setting that is based at least in part on the second amount of power credits allocated to the LDPC decoder.

In some examples, the managing component 530 may be configured as or otherwise support a means for communicating, by the LDPC decoder based at least in part on processing the portion of the plurality of data words using the second decoder engine, a second status signal indicative of completing the processing of the portion of the plurality of data words.

In some examples, the resource allocation component 535 may be configured as or otherwise support a means for allocating the first amount of power credits to the LDPC decoder based at least in part on the second status signal indicating completing the processing of the portion of the plurality of data words. In some examples, the processing component 525 may be configured as or otherwise support a means for processing, at the first decoder engine, additional data words according to a third power setting that is based at least in part on the second amount of power credits allocated to the LDPC decoder.

In some examples, to support detecting the pattern of errors in the plurality of data words, the managing component 530 may be configured as or otherwise support a means for determining that a quantity of consecutive data words having a threshold bit error rate satisfies a predetermined value.

In some examples, to support allocating the second amount of power credits to the LDPC decoder, the resource allocation component 535 may be configured as or otherwise support a means for communicating, to the LDPC decoder, a value indicative of a scaling factor relative to a maximum operating power for the LDPC decoder.

In some examples, to support communicating the status signal, the managing component 530 may be configured as or otherwise support a means for communicating a quantity of data words in a queue for the second decoder of the LDPC decoder.

In some examples, to support detecting the pattern of errors in the plurality of data words, the managing component 530 may be configured as or otherwise support a means for detecting an iteration timeout at the first decoder engine based at least in part on processing the plurality of data words.

In some examples, the managing component 530 may be configured as or otherwise support a means for communicating, by the LDPC decoder, a second status signal, the second status signal being indicative of a current state for the LDPC decoder.

In some examples, the second status signal indicates an active or inactive state for at least one of the first decoder engine, the second decoder engine, or the LDPC decoder.

In some examples, the operation control component 540 may be configured as or otherwise support a means for suspending one or more operations of the memory device based at least in part on the status signal indicating the pattern of errors in the plurality of data words. In some examples, the operation control component 540 may be configured as or otherwise support a means for reassigning power credits used by the suspended operations to the LDPC decoder, where the second amount of power credits is allocated to the LDPC decoder based on the reassigned power credits.

In some examples, to support communicating the status signal, the operation control component 540 may be configured as or otherwise support a means for receiving, at a controller processing the one or more operations, an interrupt from the LDPC decoder indicating the detection of the pattern of errors in the plurality of data words, where suspending the one or more operations of the memory device is based at least in part on receiving the interrupt.

Figure 6:
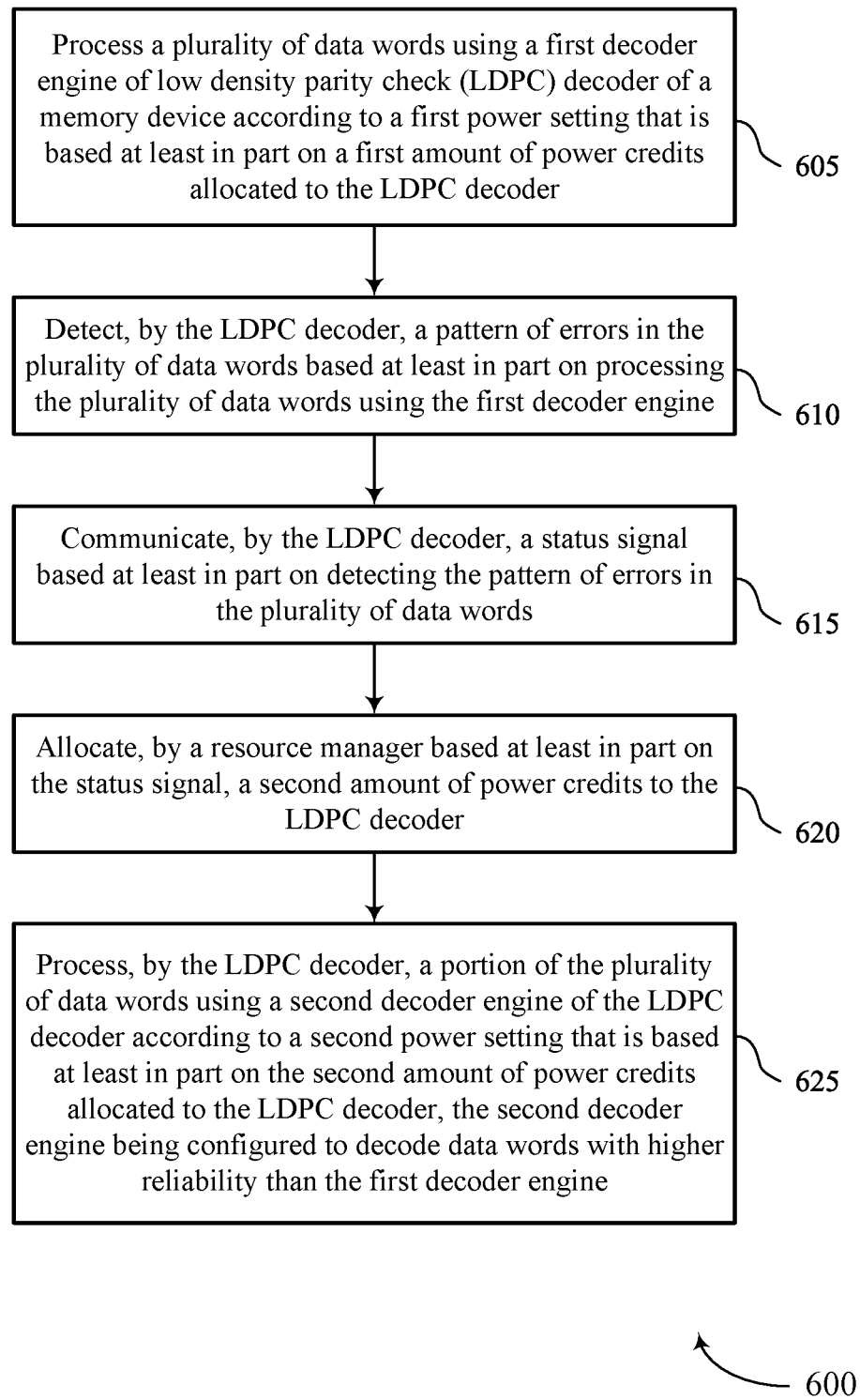
FIG. 6 shows a flowchart illustrating a method or methods that support enhanced read performance for memory data word decoding using power allocation based on error pattern detection in both QLC and TLC in accordance with examples as disclosed herein.

FIG. 6 shows a flowchart illustrating a method 600 that supports enhanced read performance for memory data word decoding using power allocation based on error pattern detection in both QLC and TLC products in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include processing a plurality of data words using a first decoder engine of a decoder of a memory device according to a first power setting that is based at least in part on a first amount of power credits allocated to the decoder. The operations of 605 may be performed in accordance with examples as disclosed herein. In some examples, aspects of the operations of 605 may be performed by a processing component 525 as described with reference to FIG. 5.

At 610, the method may include detecting, by the decoder, a pattern of errors in the plurality of data words based at least in part on processing the plurality of data words using the first decoder engine. The operations of 610 may be performed in accordance with examples as disclosed herein. In some examples, aspects of the operations of 610 may be performed by a managing component 530 as described with reference to FIG. 5.

At 615, the method may include communicating, by the decoder, a status signal based at least in part on detecting the pattern of errors in the plurality of data words. The operations of 615 may be performed in accordance with examples as disclosed herein. In some examples, aspects of the operations of 615 may be performed by a managing component 530 as described with reference to FIG. 5.

At 620, the method may include allocating, by a resource manager based at least in part on the status signal, a second amount of power credits to the decoder. The operations of 620 may be performed in accordance with examples as disclosed herein. In some examples, aspects of the operations of 620 may be performed by a resource allocation component 535 as described with reference to FIG. 5.

At 625, the method may include processing, by the decoder, a portion of the plurality of data words using a second decoder engine of the decoder according to a second power setting that is based at least in part on the second amount of power credits allocated to the decoder. The operations of 625 may be performed in accordance with examples as disclosed herein. In some examples, aspects of the operations of 625 may be performed by a processing component 525 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for processing a plurality of data words using a first decoder engine of low density parity check (LDPC) decoder of a memory device according to a first power setting that is based at least in part on a first amount of power credits allocated to the decoder; detecting, by the decoder, a pattern of errors in the plurality of data words based at least in part on processing the plurality of data words using the first decoder engine; communicating, by the decoder, a status signal based at least in part on detecting the pattern of errors in the plurality of data words; allocating, by a resource manager based at least in part on the status signal, a second amount of power credits to the decoder; and processing, by the decoder, a portion of the plurality of data words using a second decoder engine of the decoder according to a second power setting that is based at least in part on the second amount of power credits allocated to the decoder.

Aspect 2: The method, apparatus, or non-transitory computer-readable medium of aspect 1, further including operations, features, circuitry, logic, means, or instructions, or any combination thereof for communicating, by the decoder based at least in part on processing the portion of the plurality of data words using the second decoder engine, a second status signal indicative of completing the processing of the portion of the plurality of data words.

Aspect 3: The method, apparatus, or non-transitory computer-readable medium of aspect 2, further including operations, features, circuitry, logic, means, or instructions, or any combination thereof for allocating the first amount of power credits to the decoder based at least in part on the second status signal indicating completing the processing of the portion of the plurality of data words and processing, at the first decoder engine, additional data words according to a third power setting that is based at least in part on the second amount of power credits allocated to the decoder.

Aspect 4: The method, apparatus, or non-transitory computer-readable medium of any of aspects 1 through 3, where detecting the pattern of errors in the plurality of data words includes operations, features, circuitry, logic, means, or instructions, or any combination thereof for determining that a quantity of consecutive data words having a threshold bit error rate satisfies a predetermined value.

Aspect 5: The method, apparatus, or non-transitory computer-readable medium of any of aspects 1 through 4, where allocating the second amount of power credits to the decoder includes operations, features, circuitry, logic, means, or instructions, or any combination thereof for communicating, to the decoder, a value indicative of a scaling factor relative to a maximum operating power for the decoder.

Aspect 6: The method, apparatus, or non-transitory computer-readable medium of any of aspects 1 through 5, where communicating the status signal includes operations, features, circuitry, logic, means, or instructions, or any combination thereof for communicating a quantity of data words in a queue for the second decoder of the decoder.

Aspect 7: The method, apparatus, or non-transitory computer-readable medium of any of aspects 1 through 6, where detecting the pattern of errors in the plurality of data words includes operations, features, circuitry, logic, means, or instructions, or any combination thereof for detecting an iteration timeout at the first decoder engine based at least in part on processing the plurality of data words.

Aspect 8: The method, apparatus, or non-transitory computer-readable medium of any of aspects 1 through 7, further including operations, features, circuitry, logic, means, or instructions, or any combination thereof for communicating, by the decoder, a second status signal, the second status signal being indicative of a current state for the decoder.

Aspect 9: The method, apparatus, or non-transitory computer-readable medium of aspect 8, where the second status signal indicates an active or inactive state for at least one of the first decoder engine, the second decoder engine, or the decoder.

Aspect 10: The method, apparatus, or non-transitory computer-readable medium of any of aspects 1 through 9, further including operations, features, circuitry, logic, means, or instructions, or any combination thereof for suspending one or more operations of the memory device based at least in part on the status signal indicating the pattern of errors in the plurality of data words and reassigning power credits used by the suspended operations to the decoder, where the second amount of power credits is allocated to the decoder based on the reassigned power credits.

Aspect 11: The method, apparatus, or non-transitory computer-readable medium of aspect 10, where communicating the status signal includes operations, features, circuitry, logic, means, or instructions, or any combination thereof for receiving, at a controller processing the one or more operations, an interrupt from the decoder indicating the detection of the pattern of errors in the plurality of data words, where suspending the one or more operations of the memory device is based at least in part on receiving the interrupt.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

As used herein, the term "electrode" may refer to an electrical conductor, and in some examples, may be employed as an electrical contact to a memory cell or other component of a memory array. An electrode may include a trace, wire, conductive line, conductive layer, or the like that provides a conductive path between elements or components of a memory array.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory device, comprising:
  a decoder configured to:
   process a plurality of data words using a first decoder engine according to a first power setting that is based at least in part on a first amount of power allocated to the decoder in the form of a first amount of power credits;
   detect a pattern of errors in the plurality of data words based at least in part on processing the plurality of data words using the first decoder engine; and
   communicate a status signal to a resource manager based at least in part on detecting the pattern of errors in the plurality of data words; and
  the resource manager configured to allocate, based at least in part on the status signal communicated by the decoder, a second amount of power to the decoder in the form of a second amount of power credits,
wherein the decoder is further configured to process a portion of the plurality of data words using a second decoder engine of the decoder according to a second power setting that is based at least in part on the second amount of power in the form of the second amount of power credits allocated to the decoder, the second decoder engine being configured to decode data words with higher reliability than the first decoder engine.

2. The memory device of claim 1, wherein the decoder is further configured to:
communicate, to the resource manager based at least in part on processing the portion of the plurality of data words using the second decoder engine, a second status signal indicative of completing the processing of the portion of the plurality of data words.

3. The memory device of claim 2, wherein:
the resource manager is further configured to allocate the first amount of power in the form of the first amount of power credits to the decoder based at least in part on the second status signal indicating completing the processing of the portion of the plurality of data words; and
the decoder is further configured to process, using the first decoder engine, additional data words according to a third power setting that is based at least in part on the first amount of power in the form of the first amount of power credits allocated to the decoder.

4. The memory device of claim 1, wherein, to detect the pattern of errors in the plurality of data words, the decoder is further configured to:
determine if a quantity of consecutive data words having a threshold bit error rate exceeds a predetermined value.

5. The memory device of claim 1, wherein the resource manager is further configured to:
communicate, to the decoder, a value indicative of a scaling factor corresponding to a level of operation relative to a maximum operating power for the decoder based at least in part on allocating the second amount of power in the form of the second amount of power credits to the decoder.

6. The memory device of claim 1, wherein, to communicate the status signal, the decoder is further configured to:
communicate a quantity of data words in a queue for the second decoder engine of the decoder.

7. The memory device of claim 1, wherein, to detect the pattern of errors in the plurality of data words, the decoder is further configured to:
detect an iteration timeout at the first decoder engine based at least in part on processing the plurality of data words.

8. The memory device of claim 1, wherein the decoder is further configured to:
communicate a second status signal to the resource manager, the second status signal being indicative of a current state for the decoder.

9. The memory device of claim 8, wherein:
the second status signal indicates an active or inactive state for at least one of the first decoder engine, the second decoder engine, and the decoder.

10. The memory device of claim 1, further comprising:
a controller configured to:
suspend one or more operations of the memory device based at least in part on the status signal indicating the pattern of errors in the plurality of data words; and
reassign power in the form of power credits used by the suspended one or more operations to the decoder, wherein the second amount of power in the form of the second amount of power credits is allocated to the decoder based on the reassigned power.

11. The memory device of claim 10, wherein the controller is further configured to:
receive an interrupt from the decoder indicating the detection of the pattern of errors in the plurality of data words, wherein suspending the one or more operations of the memory device is based at least in part on receiving the interrupt.

12. The memory device of claim 1, wherein the second power setting corresponds to a higher clock frequency than the first power setting.

13. A method, comprising:
processing a plurality of data words using a first decoder engine of a decoder of a memory device according to a first power setting that is based at least in part on a first amount of power allocated to the decoder in the form of a first amount of power credits;
detecting, by the decoder, a pattern of errors in the plurality of data words based at least in part on processing the plurality of data words using the first decoder engine;
communicating, by the decoder, a status signal based at least in part on detecting the pattern of errors in the plurality of data words;
allocating, by a resource manager based at least in part on the status signal, a second amount of power to the decoder in the form of a second amount of power credits; and
processing, by the decoder, a portion of the plurality of data words using a second decoder engine of the decoder according to a second power setting that is based at least in part on the second amount of power in the form of the second amount of power credits allocated to the decoder, the second decoder engine being configured to decode data words with higher reliability than the first decoder engine.

14. The method of claim 13, further comprising:
communicating, by the decoder based at least in part on processing the portion of the plurality of data words using the second decoder engine, a second status signal indicative of completing the processing of the portion of the plurality of data words.

15. The method of claim 14, further comprising:
allocating the first amount of power in the form of the first amount of power credits to the decoder based at least in part on the second status signal indicating completing the processing of the portion of the plurality of data words; and
processing, at the first decoder engine, additional data words according to a third power setting that is based at least in part on the second amount of power in the form of the second amount of power credits allocated to the decoder.

16. The method of claim 13, wherein detecting the pattern of errors in the plurality of data words comprises:
determining that a quantity of consecutive data words having a threshold bit error rate satisfies a predetermined value.

17. The method of claim 13, wherein allocating the second amount of power in the form of the second amount of power credits to the decoder comprises:

communicating, to the decoder, a value indicative of a scaling factor corresponding to a level of operation relative to a maximum operating power for the decoder.

18. The method of claim 13, wherein communicating the status signal comprises:

communicating a quantity of data words in a queue for the second decoder engine of the decoder.

19. The method of claim 13, wherein detecting the pattern of errors in the plurality of data words comprises:

detecting an iteration timeout at the first decoder engine based at least in part on processing the plurality of data words.

20. An apparatus, comprising:

means for processing a plurality of data words encoded using a low density parity check (LDPC) code using a first decoder engine according to a first power setting that is based at least in part on a first amount of power in the form of a first amount of power credits allocated for decoding;

means for detecting a pattern of errors in the plurality of data words based at least in part on processing the plurality of data words using the first decoder engine;

means for allocating a second amount of power in the form of a second amount of power credits for decoding at least a portion of the plurality of data words based at least in part on detecting the pattern of errors in the plurality of data words; and means for processing the at least the portion of the plurality of data words using a second decoder engine according to a second power setting that is based at least in part on the second amount of power in the form of the second amount of power credits, the second decoder engine being configured to decode data words with higher reliability than the first decoder engine.

* * * * *